US012766837B2

(12) United States Patent
Sasaki et al.

(10) Patent No.: US 12,766,837 B2

(45) Date of Patent: Oct. 20, 2026

(54) LIQUID EJECTION HEAD

(71) Applicant: CANON KABUSHIKI KAISHA, Tokyo (JP)

(72) Inventors: Koji Sasaki, Chiba (JP); Atsunori Terasaki, Kanagawa (JP); Manabu Otsuka, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 149 days.

(21) Appl. No.: 18/790,172

(22) Filed: Jul. 31, 2024

(65) Prior Publication Data

US 2025/0065623 A1 Feb. 27, 2025

(30) Foreign Application Priority Data

Aug. 22, 2023 (JP) ................................ 2023-134329

(51) Int. Cl.
*B41J 2/14* (2006.01)
*B41J 2/16* (2006.01)

(52) U.S. Cl.
CPC ......... *B41J 2/14233* (2013.01); *B41J 2/1433* (2013.01); *B41J 2/161* (2013.01); *B41J 2/1623* (2013.01); *B41J 2002/14306* (2013.01); *B41J 2002/14411* (2013.01)

(58) Field of Classification Search
CPC ...... B41J 2/14233; B41J 2/1433; B41J 2/161; B41J 2/1623; B41J 2002/14306; B41J 2002/14411; B41J 2/14201
See application file for complete search history.

(56) References Cited

U.S. PATENT DOCUMENTS

| | | | | |
|---|---|---|---|---|
| 11,951,742 | B2 | 4/2024 | Yonemoto et al. | |
| 12,115,788 | B2 | 10/2024 | Murakami et al. | |
| 2022/0379606 | A1* | 12/2022 | Yonemoto | B41J 2/1632 |
| 2024/0253354 | A1 | 8/2024 | Yonemoto et al. | |

FOREIGN PATENT DOCUMENTS

| | | | |
|---|---|---|---|
| JP | 2004-249668 | A | 9/2004 |
| JP | 2014-124887 | A | 7/2014 |
| JP | 2022-138404 | A | 9/2022 |
| JP | 2022-184759 | A | 12/2022 |
| JP | 2023-30447 | A | 3/2023 |

* cited by examiner

*Primary Examiner* — Lisa Solomon

(74) *Attorney, Agent, or Firm* — VENABLE LLP

(57) ABSTRACT

A liquid ejection head including: a joined substrate of a first substrate and a second substrate that are layered and joined with an adhesive is used. In the liquid ejection head, the joined substrate has a liquid channel by means of which the first substrate and the second substrate communicating, on a joining position of the first and the second substrate, the adhesive is disposed at a corner part so as to form an arcuate shape convex toward the corner part on a cross section thereof, the corner part being formed at a position corresponding to the liquid channel, the corner part being formed by an end face of the first substrate, and a plane of the second substrate, and on the joining position, a protective film is provided to be continuous from the first substrate via the adhesive disposed on the corner part.

5 Claims, 18 Drawing Sheets

LIQUID EJECTION HEAD

BACKGROUND OF THE INVENTION

Field of the Invention

The present disclosure relates to liquid ejection heads.

Description of the Related Art

One example of functional devices such as MEMS (Micro Electro Mechanical System) including pressure sensors and acceleration sensors, and microfluidic devices is a liquid ejection head of ejecting liquid. The liquid ejection head is also referred to as an inkjet recording head or a liquid jetting head, and is used for a printing apparatus of doing printing by ejection of liquid. In production of these devices, devices formed of joined substrate bodies which are substrates joined via organic films (adhesive) are produced. For stability in ejection of the liquid ejection head, and for improvement in appearance of print, mechanisms for circulating ink in the head have been often provided in recent years.

Japanese Patent Application Publication No. 2014-124887 proposes the method of forming a protective film for substrates joined via an organic film (adhesive) as a method of reducing damage to a joined substrate caused by ink.

SUMMARY OF THE INVENTION

As described, it is demanded to further improve the stability in ejection, and the appearance of print of the liquid ejection head which uses a joined substrate. Therefore, particularly, preferred protection for ink channels is demanded.

The present invention was made with the foregoing problem in view, and an object thereof is to provide a technique for protecting ink channels formed inside the liquid ejection head which uses a joined substrate.

The present invention provides a liquid ejection head comprising:

a joined substrate of a first substrate and a second substrate, the first substrate and the second substrate being layered and joined with an adhesive, wherein the joined substrate is configured to have a liquid channel, the first substrate and the second substrate communicating by the liquid channel, on a joining position of the first substrate and the second substrate, the adhesive is disposed at a corner part so as to form an arcuate shape convex toward the corner part on a cross section thereof, the corner part being formed at a position corresponding to the liquid channel, the corner part being formed by an end face of the first substrate, and a plane of the second substrate, and on the joining position, a protective film is provided so as to be continuous from the first substrate via the adhesive disposed on the corner part to the second substrate.

According to the present invention, the technique for protecting ink channels formed inside the liquid ejection head which uses a joined substrate can be provided.

Further features of the present invention will become apparent from the following description of exemplary embodiments with reference to the attached drawings.

DESCRIPTION OF THE EMBODIMENTS

Figure 1:
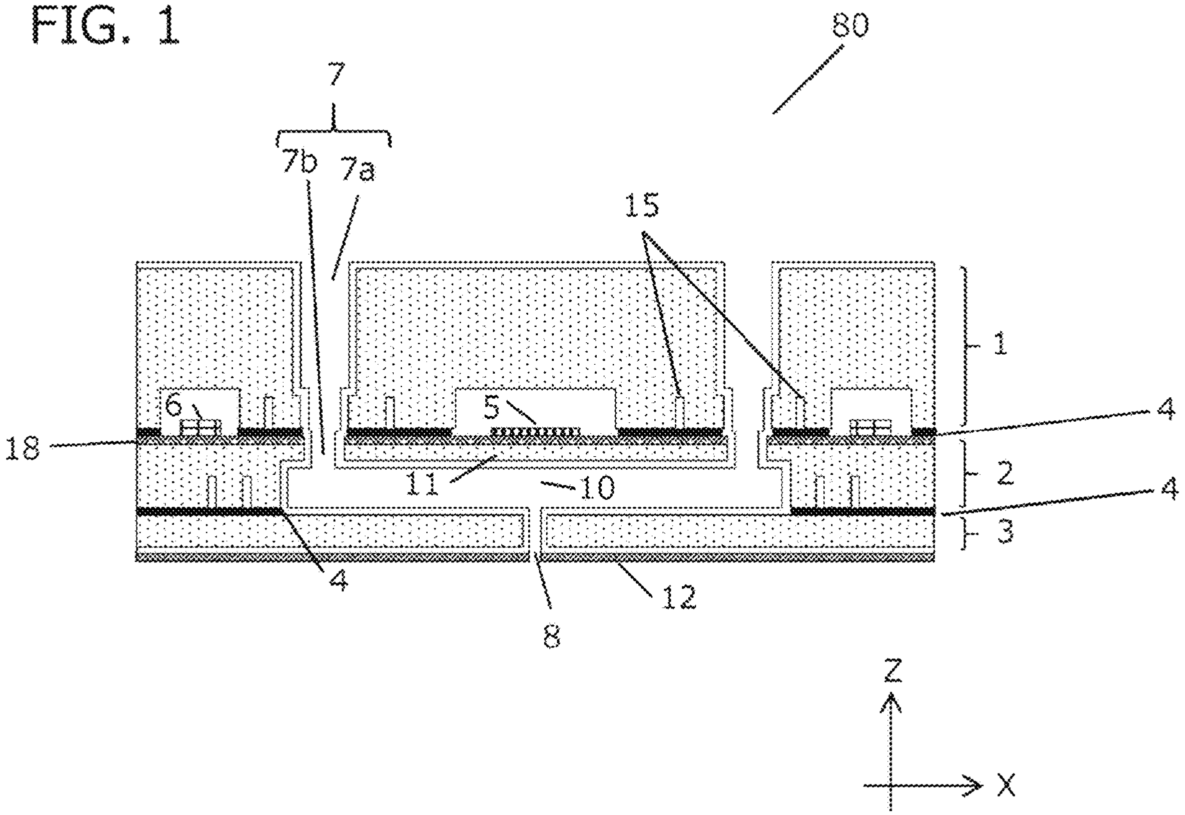
FIG. 1 is a schematic cross-sectional view of a joined substrate used for a liquid ejection head.

Hereinafter preferred embodiments of the technique in the present disclosure will be described with reference to the drawings. The dimensions, the materials, the shapes, the relative arrangements, etc. of the components described below should be changed appropriately according to the structure of an apparatus to which the invention is applied, and according to various conditions. The embodiments are thus not construed as limiting the scope of this invention to the following description. Any well-known or known art in this technical field may be applied to configurations and steps not particularly shown or described. Redundant descriptions may be omitted.

These embodiments describe joining of three substrates as an example. The present invention is however not limited to this, and is also applicable to joining of a plurality of substrates.

Here, the problem about conventional liquid ejection heads that was found by the inventor will be described. The inventor found that upon circulating ink in ink channels in a liquid ejection head which uses a joined substrate, bubbles adhere to areas of poor wettability when materials of different levels of wettability, such as a protective film and an adhesive, are present in a mixed manner on the inside of the ink channels. In addition, in the liquid ejection head, the inner wall surfaces of the ink channels tend to be eroded by ink, and the structure of the channels may decay if having been exposed to ink for a long time. Particularly, when the substrate is silicon, such damage by ink tends to occur.

Japanese Patent Application Publication No. 2014-124887 as described above proposes the method of forming a protective film for substrates joined via an organic film (adhesive) as a method of reducing damage to the substrates caused by ink. According to the inventor's studies, however, it was found that when a protective film is formed throughout the inner wall surfaces of the ink channels, and an organic film (adhesive) as Japanese Patent Application Publication No. 2014-124887, bubbles adhere, and the ink flow is impeded on any corner part of joining parts of the substrates. Remaining of bubbles like this leads to bad ink ejection, which may deteriorate the appearance of print.

Then, as a result of the inventor's studies, it was found out that gathering of bubbles, and impeding of the ink flow can be suppressed by providing corner parts in the ink channels with R's, and by equating the wettability on the inside of the ink channels. This can improve the efficiency in circulation of ink to improve the appearance of print. The following embodiments specifically describe such a structure of the invention of the present application.

Embodiment 1

Hereinafter substrates for a liquid ejection head according to embodiment 1 of the present invention will be described with reference to the drawings. This embodiment shows an example of using piezoelectric elements as energy generating elements. The present invention is however not limited to this, but is applicable to joining of substrates having elements which can boil ink by electric heating, such as heating elements. An example of a liquid ejection head to which the present invention is applicable is a member of a printing apparatus such as an inkjet printer. The printing apparatus is also provided with a liquid storing part of storing liquid to be fed to the liquid ejection head, a conveying mechanism for recording media for doing printing, etc.

Structure of Joined Substrate

FIG. 1 is a schematic cross-sectional view of a joined substrate 80 for the liquid ejection head according to embodiment 1 of the present invention. The joined substrate 80 of this embodiment is formed by joining, via an adhesive 4, a first substrate 1 where ink channels 7 (liquid channels) are formed, a second substrate 2 where a plurality of piezoelectric elements 5 and electrodes 6 are formed, and a third substrate 3 where a plurality of ejection ports 8 are formed. That is, the joined substrate 80 at least has a plurality of joining faces joined using the adhesive. Part of the adhesive 4 that overflows the joining faces is absorbed in grooves 15.

The first substrate 1 is formed of, for example, a silicon substrate, and first openings 7*a* forming the ink channels 7 are formed therein. The second substrate 2 is formed of, for example, a silicon substrate, and has a vibrating film 11 on which the piezoelectric elements 5 are formed. The vibrating film 11 forms the ceilings of pressure chambers 10 to separate a plurality of the pressure chambers 10. Further, second openings 7*b* communicating with the first openings 7*a* to form the ink channels 7 which are for introducing liquid into the pressure chambers 10 are formed in the second substrate 2. The third substrate 3 is formed of, for example, a silicon substrate, and the ejection ports 8 via which liquid is ejected are formed therein. The ejection ports 8 penetrate the third substrate 3. When the pressure chambers 10 are viewed from the third substrate side, the side of a face which faces the pressure chambers 10, and the side of a face on the opposite side of the pressure chambers 10 communicate by means of the ejection ports 8. Therefore, the volume change in any of the pressure chambers 10 causes the liquid stored in the pressure chamber 10 to be ejected via the ejection port 8.

On the first substrate 1, an ink tank (not shown) is disposed. Therefore, the liquid in the ink tank is fed to the pressure chambers 10 through the first openings 7*a*.

On the vibrating film 11, the piezoelectric elements 5 are disposed to constitute piezoelectric actuators. The piezoelectric elements 5 are provided with lower electrodes (not shown) formed on a vibrating film formation layer, the piezoelectric elements 5 formed on the lower electrodes, and upper electrodes (not shown) formed on the piezoelectric elements. On the vibrating film 11, the electrodes 6 for external connection are also disposed.

The piezoelectric elements 5 are formed at positions facing the pressure chambers 10 across the vibrating film 11. That is, the piezoelectric elements 5 are formed so as to be in contact with a surface of the vibrating film 11 which is on the opposite side of the pressure chambers 10. It is characteristic of the vibrating film 11 to be deformable in a direction opposite to the pressure chambers 10. As shown, a protective film 18 may be provided on the second substrate 2. The protective film 18 is made from, for example, SiN, and has the function of protecting wiring layers, the piezoelectric elements, etc. In the following description, the protective film 18 provided on the second substrate 2 is considered to be part of the second substrate 2. That is, when the adhesive 4 is applied, the second substrate 2 and the protective film 18 form one body, and thus, based on this state, the boundary of the first substrate 1 and the second substrate 2 is determined.

Applying a driving voltage to the piezoelectric elements 5 from a driving IC (not shown) through wiring deforms the piezoelectric elements 5 by the inverse piezoelectric effect. This deforms the vibrating film 11 together with the piezoelectric elements 5, which brings about volume changes in the pressure chambers 10 to pressurize the liquid such as ink. The pressurized liquid is ejected via the ejection ports 8 in the form of microdroplets.

Joining, and Behavior of Adhesive

Next, joining of the first substrate 1 and the second substrate 2 according to the present invention will be described in detail. In the present invention, an example for the first substrate 1 and the second substrate 2 is shown, but the present invention is not limited to this. The present invention may be applied to the second substrate 2 and the third substrate 3, and when the number of the substrates is larger, may be applied to these substrates.

Figure 3A:
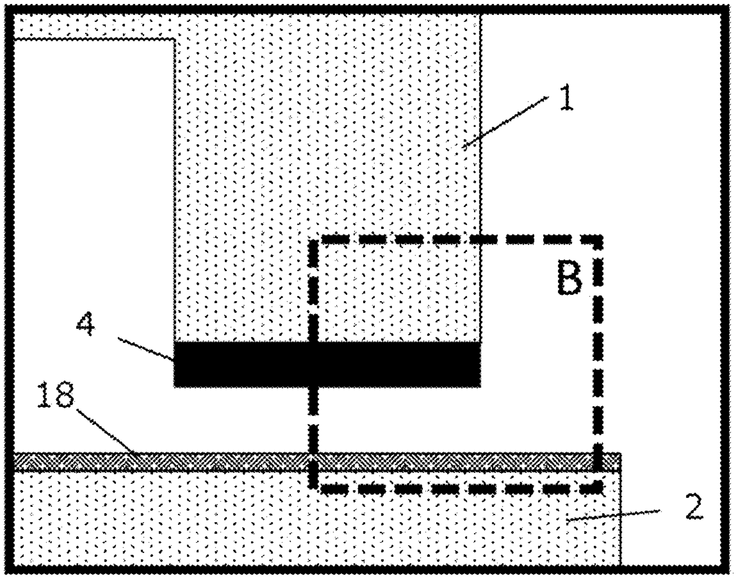
FIGS. 3A to 3C are enlarged schematic views illustrating the behavior of an adhesive in joining.
Figure 3B:
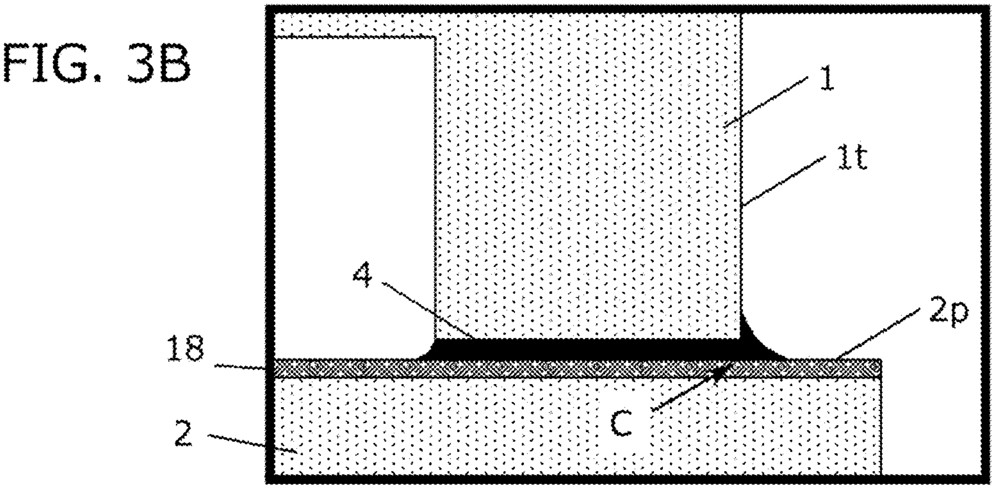
Figure 3C:
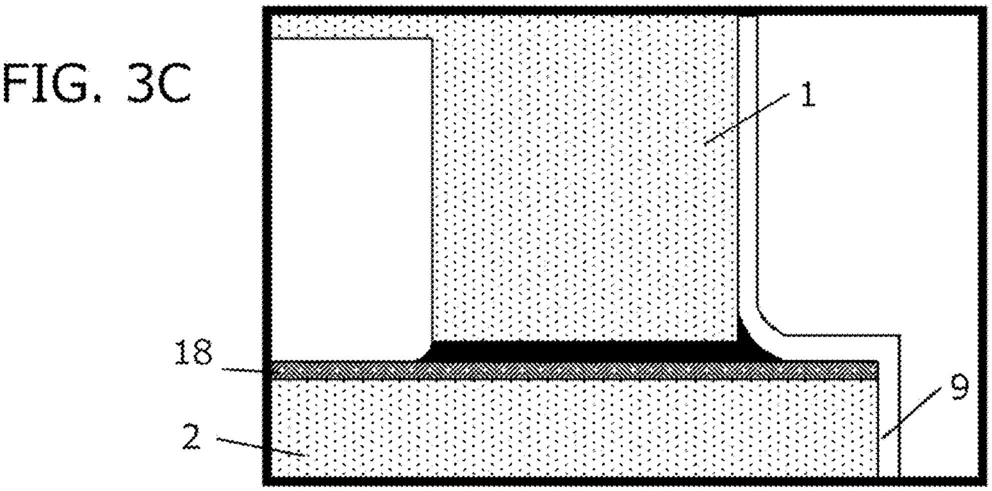
Figure 4A:
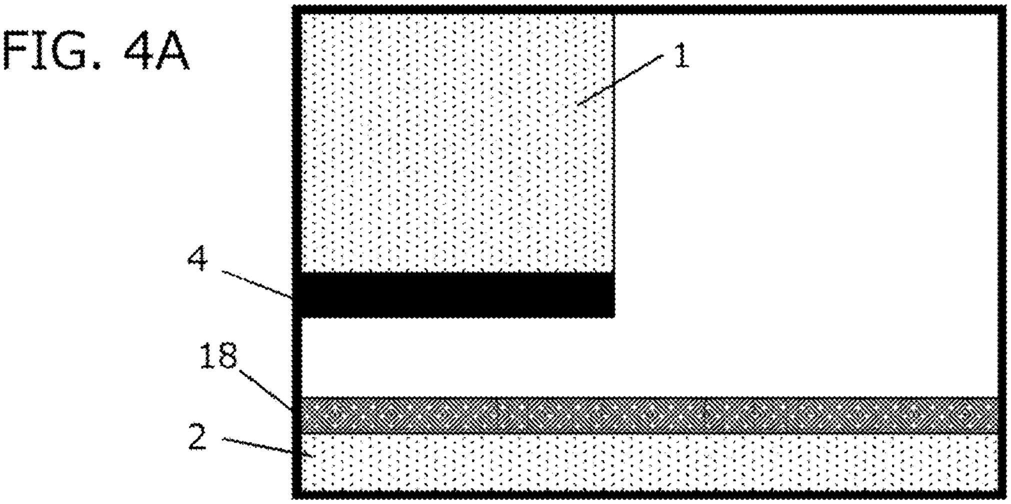
FIGS. 4A to 4C are further enlarged schematic views illustrating the behavior of the adhesive in joining.
Figure 4B:
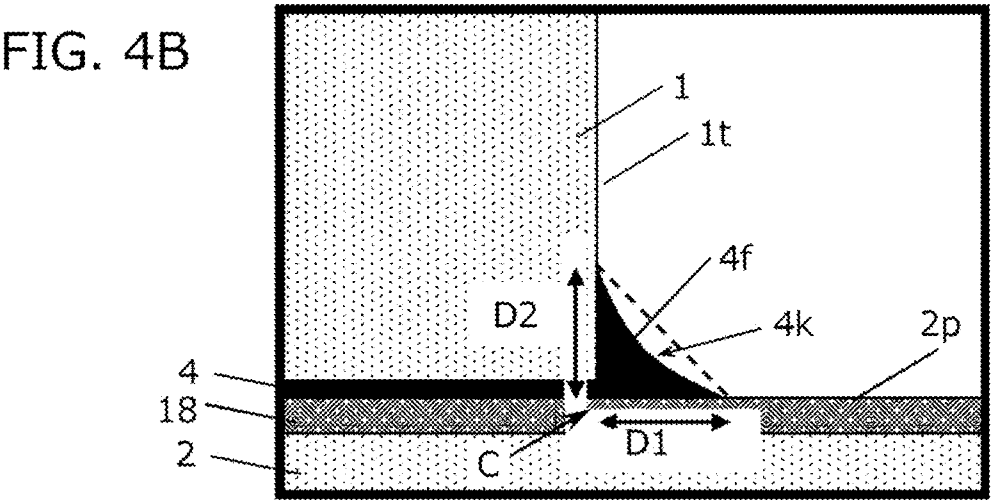
Figure 4C:
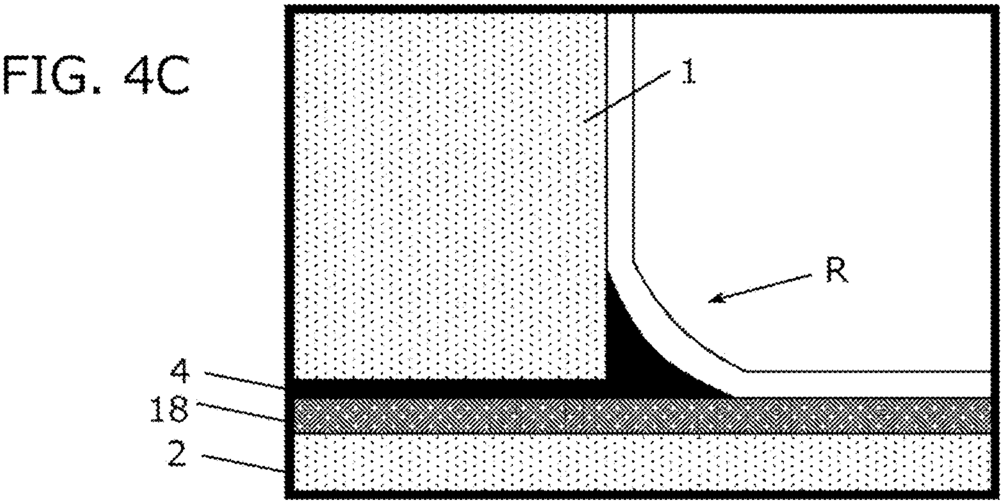

FIGS. 3A to 3C show the state where the second substrate 2 is joined to the first substrate 1 via the adhesive 4, and a Si protective film is formed. FIGS. 4A to 4C are enlarged views of the area B indicated by the dashed line of FIG. 3A. FIGS. 4A to 4C correspond to FIGS. 3A to 3C, respectively. FIGS. 3A and 4A show the state where the adhesive 4 is applied to a bottom face of the first substrate 1 (face opposite the second substrate 2), and then, the first substrate and the second substrate are brought closer to each other to be joined.

FIGS. 3B and 4B show the state after the joining. At this time, joining of the substrates causes the adhesive 4 to flow out of the interface of the joined substrates by a capillary phenomenon to form a spread part 4*f*. The flowing-out portion of the adhesive 4 is allowed to flow along a corner part formed by the substrates, and thereby, the cross-sectional shape of the surface of the adhesive 4 at the corner part on the joining interface is an arc having a concave part 4*k*. That is, on the cross section, on a corner part C formed by an extension line of an end face 1*t* of the first substrate 1, and a plane 2*p* of the second substrate 2 (more accurately, the protective film 18 which forms one body with the second substrate 2 when the adhesive 4 is applied), the cross-sectional shape of the adhesive 4 forms an arc convex toward the corner part C. Therefore, as the adhesive 4, one that flows according to temperature, heat and/or load is preferably selected. That the cross-sectional shape of the surface of the adhesive is an arc referred to herein means that, as shown in the cross-sectional view of FIG. 4B, on the joining position, the surface of the adhesive is inside (on the closer side to the corner part than) the straight line (indicated by the dashed line in the drawing) formed by the distance D1 where the adhesive 4 spreads across the second substrate 2 (distance of the adhesive 4 having spread across the second substrate 2 from the corner part to the position furthest from the corner part), and the distance D2 where the adhesive 4 spreads across the first substrate 1 (distance of the adhesive 4 having spread across the first substrate 1 from the corner part to the position furthest from the corner part) on the cross section.

The expression of an arc is used because, in many cases, the surfaces become curved lines on cross sections thereof due to a characteristic of the adhesive 4 such that the adhesive 4 has flowability to some extent, whereas the surface is not necessary to be formed by a curved line only on the cross section as long as the surface is inside the line D1-D2 as descried above, and for example, may be a straight line and a curved line in combination. The part of the curved line may be a circular arc, an elliptical arc, or any other curved line. Any shape of the surface of the adhesive 4 brings about the effect to some extent as long as the shape does not rise more than the line D1-D2, but is depressed on the cross section.

FIGS. 3C and 4C show the state where a protective film 9 is further formed. It is found that the presence of the concave part 4*k* on the base layer of the protective film 9 results in formation of a depressed portion (round concave portion R) also on the protective film 9, which is to be in direct contact with ink.

Considering Spread of Adhesive

Figure 5A:
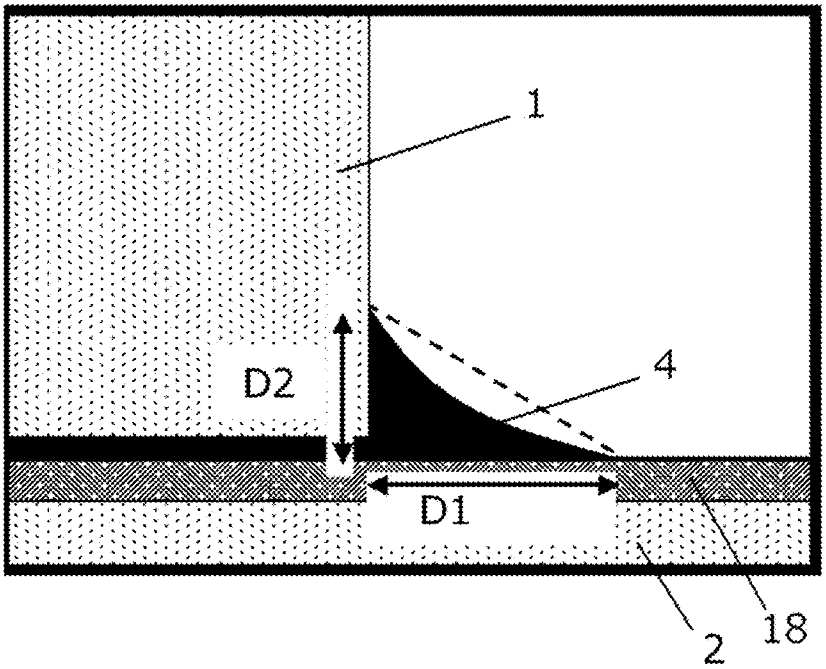
FIGS. 5A and 5B are cross-sectional views for considering the spreading amount of the adhesive.
Figure 5B:
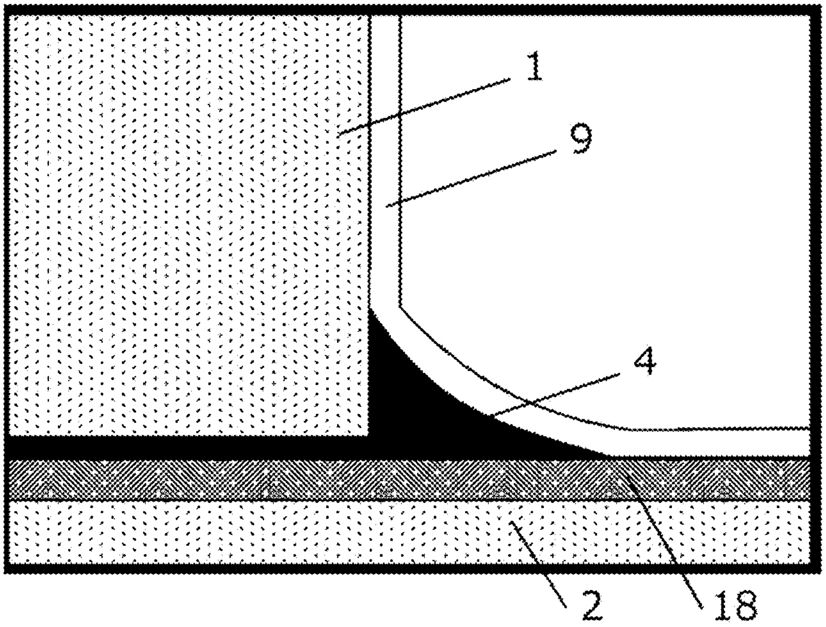
Figure 6A:
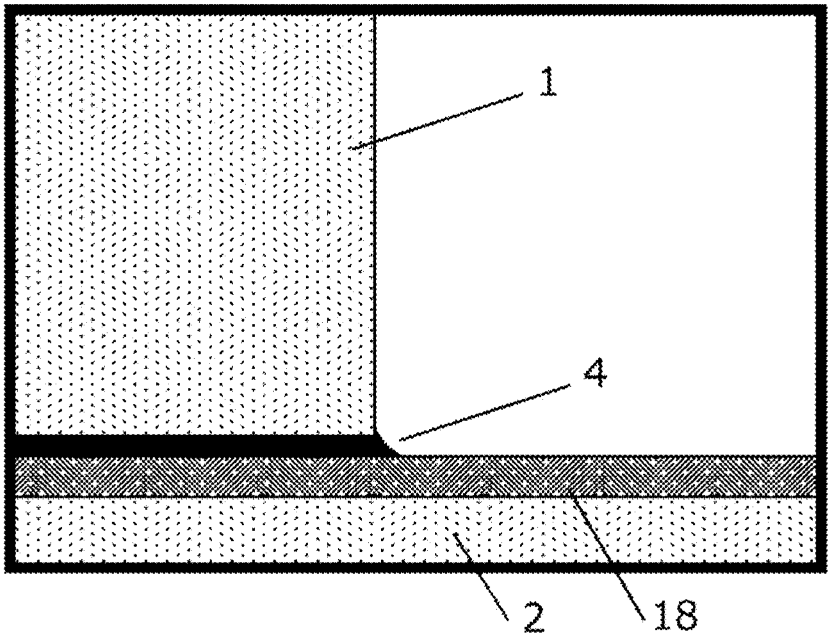
FIGS. 6A and 6B are cross-sectional views for comparison for considering the spreading amount of the adhesive.
Figure 6B:
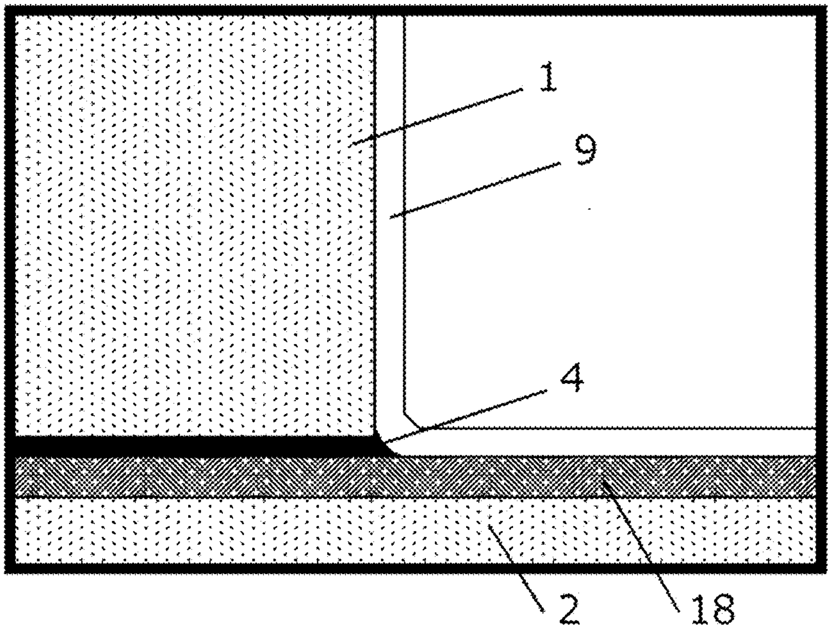
Figure 7A:
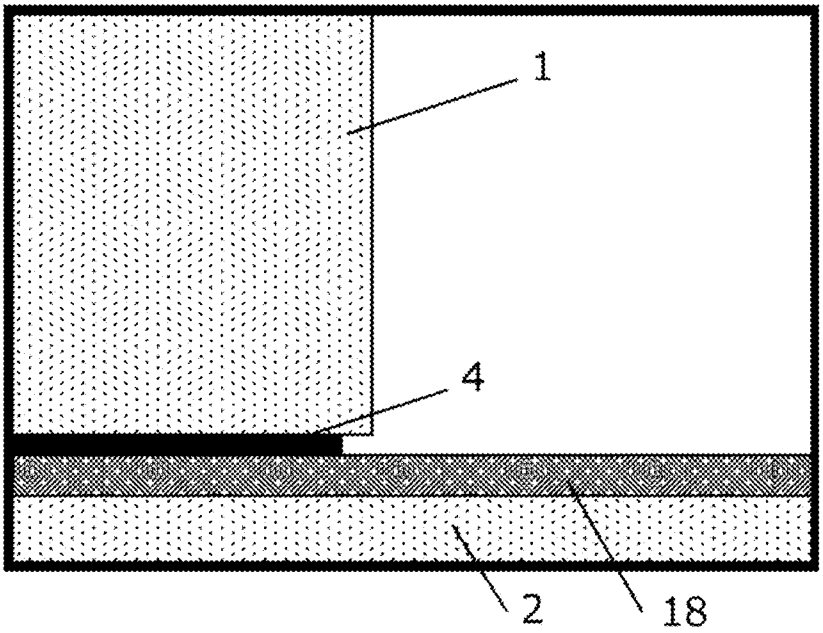
FIGS. 7A and 7B are cross-sectional views for comparison for considering the spreading amount of the adhesive.
Figure 7B:
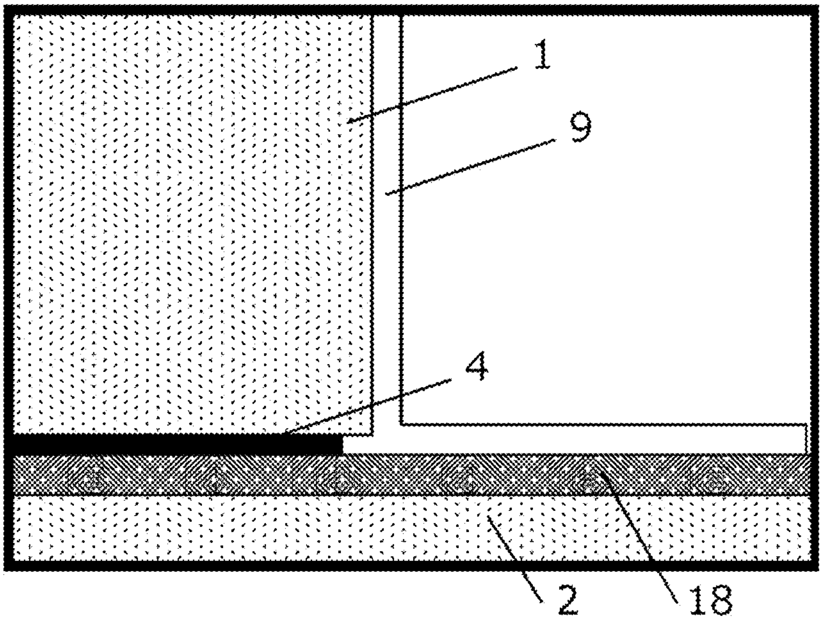

FIGS. 5A to 7B show examples of different spreading amounts of the adhesive. FIGS. 5A, 6A and 7A show the condition of the spread of the adhesive, and FIGS. 5B, 6B and 7B show the state after the protective film 9 is formed.

FIGS. 5A and 5B show an example in which the distances D1 and D2 are different because the first substrate 1 and the second substrate 2 are different in wettability for the adhesive 4. In the case shown by these drawings, the cross-sectional shape of the concave part is not an arc, but is more similar to an elliptical arc. Even in such a case, the effect of the present invention is obtained.

FIGS. 6A and 6B show the case where the amount of the spread of the adhesive 4, which has spread out of the joining part, is small due to the surface characteristics of the first substrate 1 and the second substrate 2, the flowability of the adhesive 4, etc. In this case, the effect of suppressing bubble gathering when ink is circulated becomes weaker than the case of FIG. 4C, and than the case of FIG. 5A. It is noted that the effect is obtained to some extent.

In contrast, FIGS. 7A and 7B show the state where the adhesive does not spread, but stays inside the space held between the substrates. In this case, as shown in FIG. 7B, the protective film 9 does not form R. Therefore, the effect of suppressing bubble gathering when ink is circulated in the ink channels becomes extremely weak.

Variations of Opening and Cross-Sectional Shape

Figure 8A:
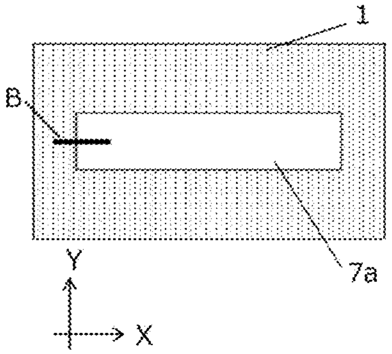
FIGS. 8A to 8C are top views showing variations of the shape of an opening of the joined substrate.
Figure 8B:
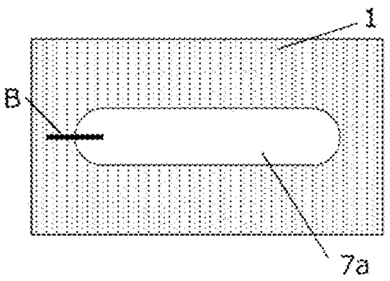
Figure 8C:
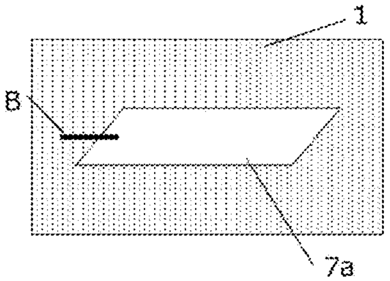

For forming the openings which are formed through the substrates, a processing method such as dry etching and wet etching, or a processing method using a laser is used. The top views of FIGS. 8A to 8C show examples of different shapes of one of the first openings 7*a*, which form the ink channels 7. The reference sign B indicates the position corresponding to the area B of FIG. 3A. Such difference in shape also changes the behavior on the interface of the joined substrates.

Figure 9A:
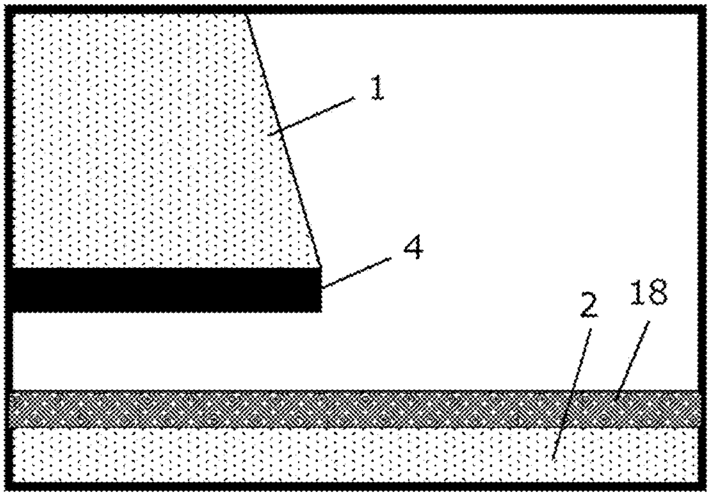
FIGS. 9A to 9C are cross-sectional views showing variations of the shape of a substrate.
Figure 9B:
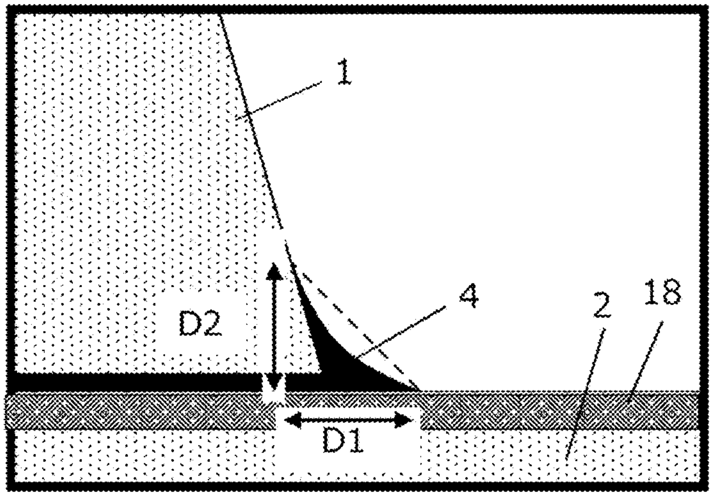
Figure 9C:
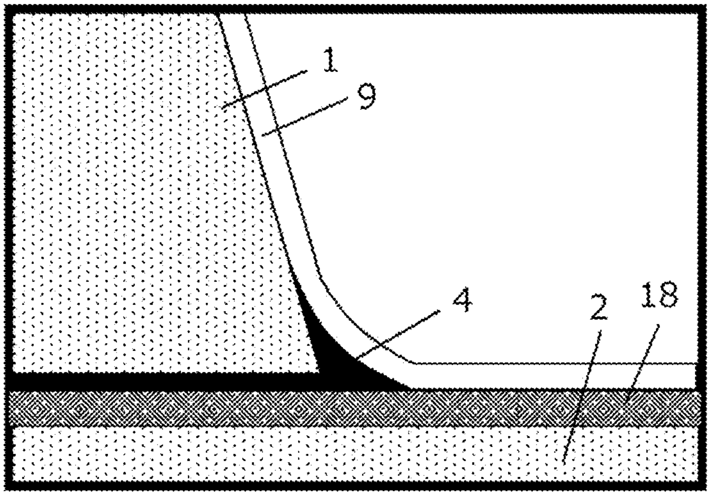
Figure 10A:
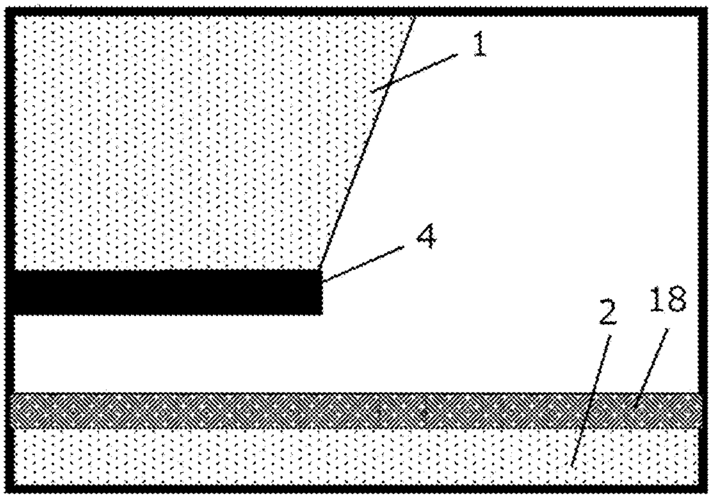
FIGS. 10A to 10C are cross-sectional views showing variations of the shape of the substrate.
Figure 10B:
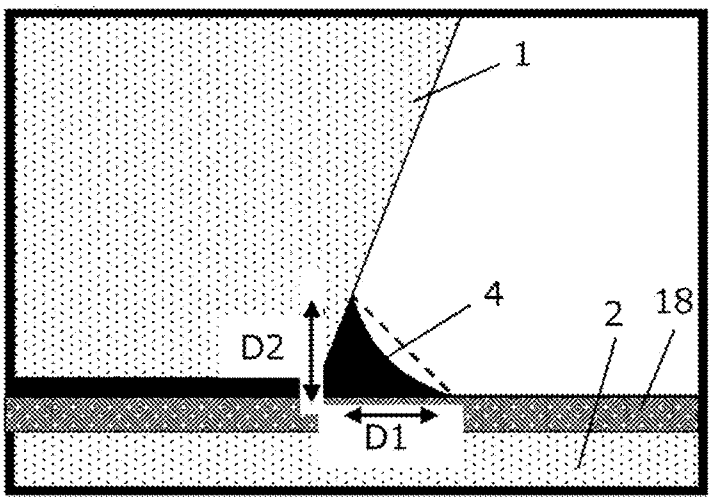
Figure 10C:
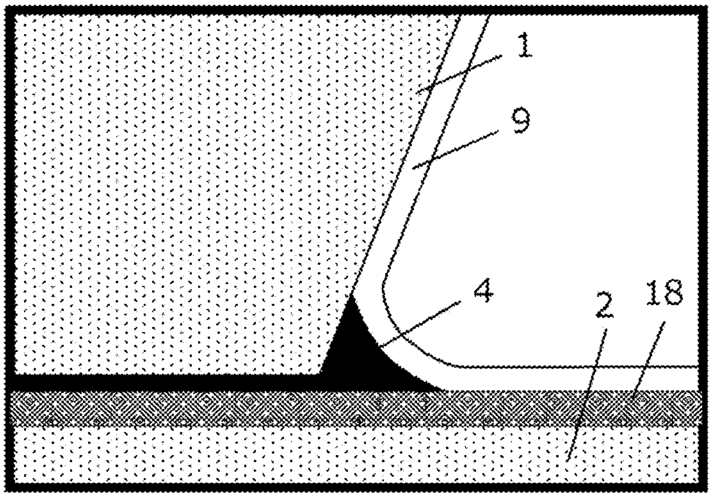
Figure 11A:
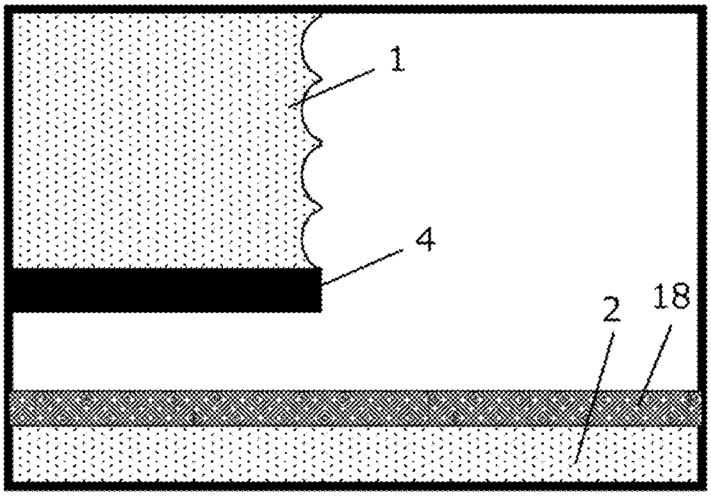
FIGS. 11A to 11C are cross-sectional views showing variations of the shape of the substrate.
Figure 11B:
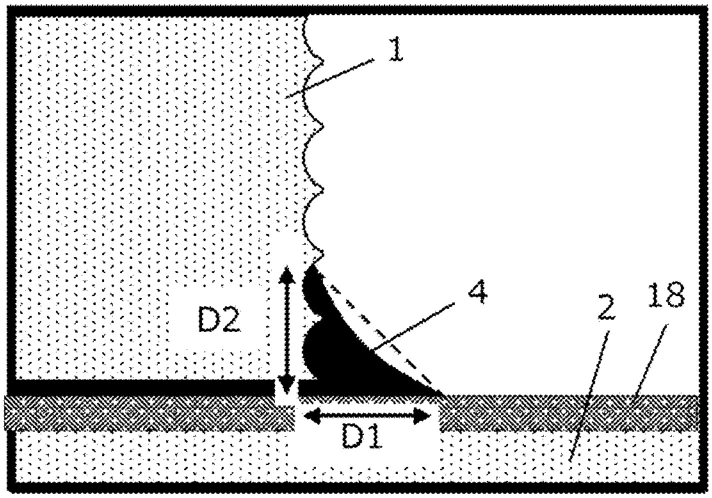
Figure 11C:
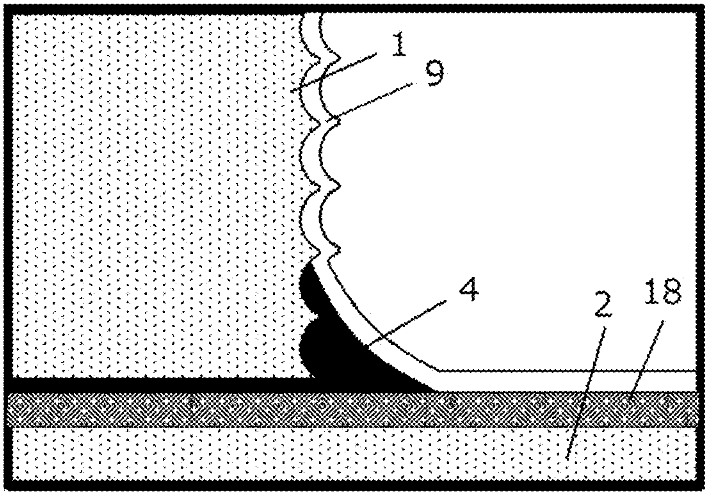

Further, FIGS. 9A to 11C are cross-sectional views each showing the state where the behavior of the adhesive 4 changes according to different cross-sectional shapes of the first substrate 1. FIGS. 9A to 9C show the case where the closer the first substrate 1 is to the second substrate 2, the wider the first substrate 1 is on the cross section of the first substrate 1. In this case, the base of the first substrate 1 has an acute angle on the cross section. FIGS. 10A to 10C show the case where the closer the first substrate 1 is to the second substrate 2, the narrower the first substrate 1 is on the cross section of the first substrate 1. In this case, the base of the first substrate 1 has an obtuse angle. FIGS. 11A to 11C show scallops when the first opening 7*a* is formed by the Bosch process for dry etching.

In any cases, it is important to form the adhesive inside the straight line formed by D1 and D2 as shown in FIGS. 9B, 10B and 11B. For this, preferably, the material of the first substrate 1 and the second substrate 2, the kind of the adhesive 4, etc. are selected appropriately. Even in any of these cases, a preferred R can be formed on the protective film 9 as well as the case where the end face of the first substrate 1 is perpendicular to the plane of the second substrate 2.

Controlling Spreading Amount of Adhesive

As described above, when the adhesive 4 stays inside the space held between the substrates, the effect of the present invention is not obtained. On the contrary, however, extreme spread of the adhesive 4 out of the space held between the joined substrates may clog the ink channels 7 formed on the joining faces, and/or may spread across the second openings where the piezoelectric elements are stored to influence ejection. Thus, the adhesive 4 is preferably of a type not having excessive flowability, and the applying amount thereof is necessary to be proper.

Here, a direction where the substrates are layered is defined as a layering direction (Z-direction in the drawings), a direction which crosses the layering direction, and where the substrates extend is defined as an extending direction (X-direction in the drawings), and a direction which crosses the layering direction and the extending direction, and where the end faces of the substrates are continuous in the opening parts (for example, a direction where the first substrate 1 forms the boundary with the first openings 7*a*) is defined as an end face direction (Y-direction in the drawings). The inventor found out that in the present invention, the distance (D2) of the concave part 4*k* of the adhesive 4 in the layering direction, and the distance (D1) thereof in the extending direction, where the substrates extend, is each preferably at least 3 μm and not more than 20 μm, and more preferably at least 5 μm and not more than 15 μm. In the case of FIG. 4B, the concave part 4*k* has an approximately arcuate shape, and thus, the distances D1 and D2 together may be referred to as an "arc width D". The arc width D can be controlled by providing grooves for storing the adhesive on the surface of any of the substrates on the joining interface, or by appropriately optimizing the film thickness of the adhesive. The same approach may be applied even when the concave part 4*k* does not have an arcuate shape. For example, as in FIG.

5A, when the distance D2 in the layering direction, and the distance D1 in the substrates extending direction are different, D1 and D2 are each preferably at least 3 μm and not more than 20 μm, and more preferably at least 5 μm and not more than 15 μm.

In the joined substrate 80, the areas where electrode pads or piezoelectric elements are formed, and the areas where the ink channels 7 are formed may be adjacent to each other via the substrates. For example, in FIG. 2A, in the area indicated by the dashed line A, the ink channel 7 is formed on the right side of the area A, and an electrode storing part 16 where the electrode 6 is disposed is formed on the left side thereof. At this time, the spread of the adhesive 4 across the left side of the dashed line A covers the electrode, which is not desirable in view of performance and quality. The foregoing is also applied to the piezoelectric elements 5. In contrast, the adhesive 4 is desired to spread across the area where the ink channel 7 is formed as far as a proper concave part is formed.

Figure 12A:
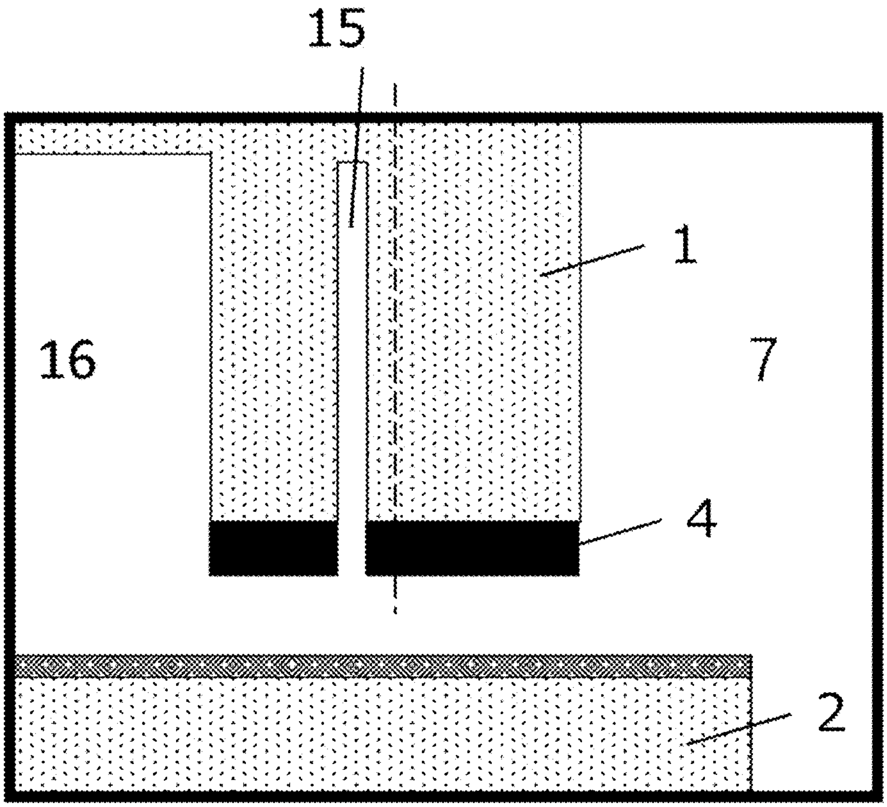
FIGS. 12A and 12B are schematic cross-sectional views of a method of controlling the adhesive.
Figure 12B:
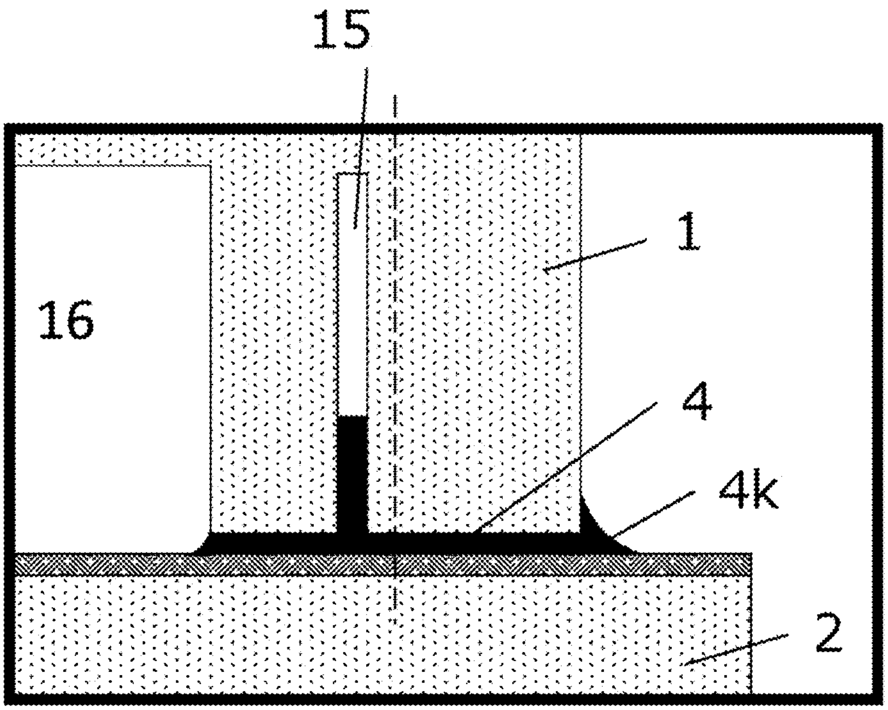

Thus, a method of appropriately spreading the adhesive 4 across desired positions is considered. FIG. 12A is an enlarged view of the area indicated by the dashed line A. As shown here, the groove 15 for storing the adhesive 4 is provided closer to the side (left side) of the corresponding area of the first substrate 1 where the adhesive is not desired to spread. This can suppress the spread of the adhesive on the left side as shown in FIG. 12B. In contrary, the adhesive 4 spreads in a proper amount on the right side to form the concave part 4*k*. For simplification, the number of the groove 15 is one in the drawings, but a plurality of the grooves 15 may be provided.

Figure 13A:
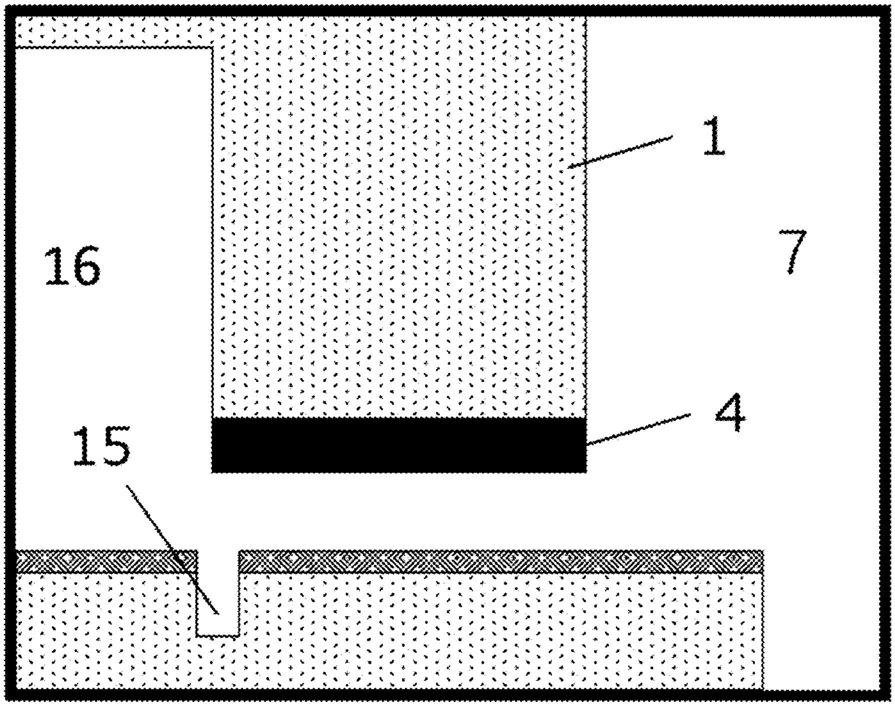
FIGS. 13A and 13B are schematic cross-sectional views of a method of controlling the adhesive.
Figure 13B:
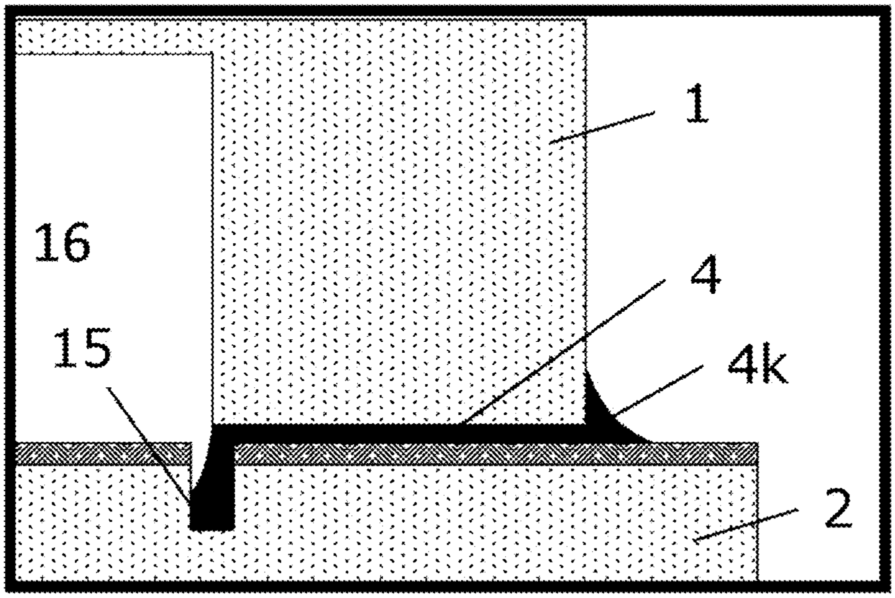

As shown in FIGS. 13A and 13B, the groove 15 for storing the adhesive 4 may be provided on the second substrate 2 side. The grooves 15 may be also provided in both the first substrate 1 and the second substrate 2, respectively.

Figure 14A:
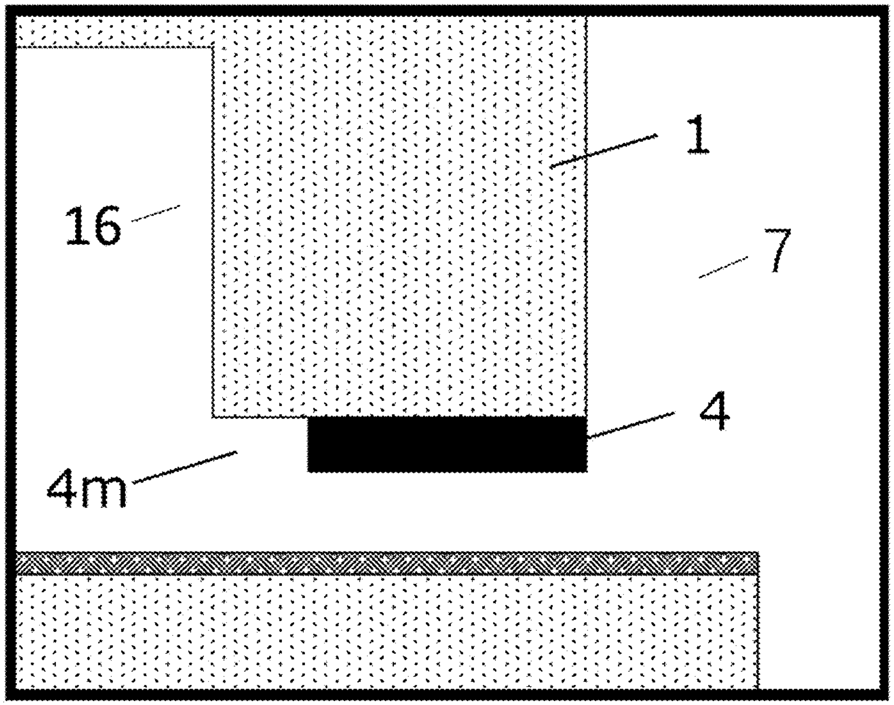
FIGS. 14A and 14B are schematic cross-sectional views of a method of controlling the adhesive.
Figure 14B:
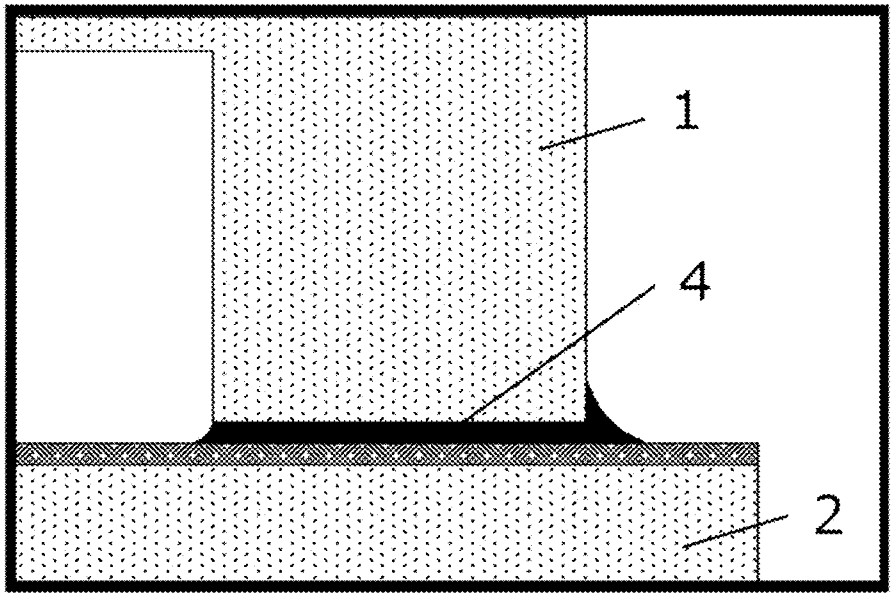

As shown in FIGS. 14A and 14B, the spread can be also controlled by controlling the area of the substrate where the adhesive 4 is formed. In the example shown, an adhesive uncoating part 4*m* is provided on the left side area on a bottom face of the first substrate 1 where the spread of the adhesive 4 is desired to be prevented. On the left side area, the applying amount of the adhesive 4 may be smaller than that on the right side area but not zero. The applying amount may be gradually reduced from the right side to the left side.

Joining Step

Next, a series of the steps of making the joined substrate 80 will be described. These steps start from the stage of producing the ink channels 7, the pressure chambers 10, the grooves 15, the electrode storing parts 16, etc. on the first substrate 1 to the third substrate by known methods such as etching and lithography in combination, and disposing the piezoelectric elements 5, the electrodes 6, wiring not shown, etc.

Step of Producing Substrates

Silicon is preferable as the material of the first substrate 1, the second substrate 2 and the third substrate 3. Other than silicon, silicon carbide, silicon nitride, any of various glasses (silica glass, borosilicate glass, alkali-free glass, and soda-lime glass), any of various ceramics (alumina, gallium arsenide, gallium nitride, and aluminum nitride), or a resin may be used. For example, the first substrate 1 and the second substrate 2 are each set to have a thickness of 625 μm. The first openings 7*a* of the first substrate 1, and the second openings 7*b* of the second substrate 2 are formed at positions so as to communicate with each other after the joining to form the channels 7.

Lower electrodes (not shown), the piezoelectric elements 5 on the lower electrodes, and upper electrodes (not shown) on the piezoelectric elements are formed on the vibrating film formation layer of the first substrate 1. In the electrode storing parts 16, the electrodes 6 are formed. For example, the vibrating film formation layer is formed by plasma CVD. Next, hydrogen barrier films (not shown), the lower electrodes (not shown), piezoelectric body films, and the upper electrodes (not shown) are formed in order. For example, the lower electrodes and the upper electrodes are formed by sputtering, and the piezoelectric body films are formed by the sol-gel process, but may be formed by sputtering.

A PZT (lead zirconate titanate) film formed by, for example, the sol-gel process or sputtering can be applied for each of the piezoelectric elements 5. Such a piezoelectric element 5 is formed of a sintered compact of a metal oxide crystal. An actuator substrate can be formed by forming the interlayers, and wiring (not shown) so that an actuator unit can be driven.

Figure 2A:
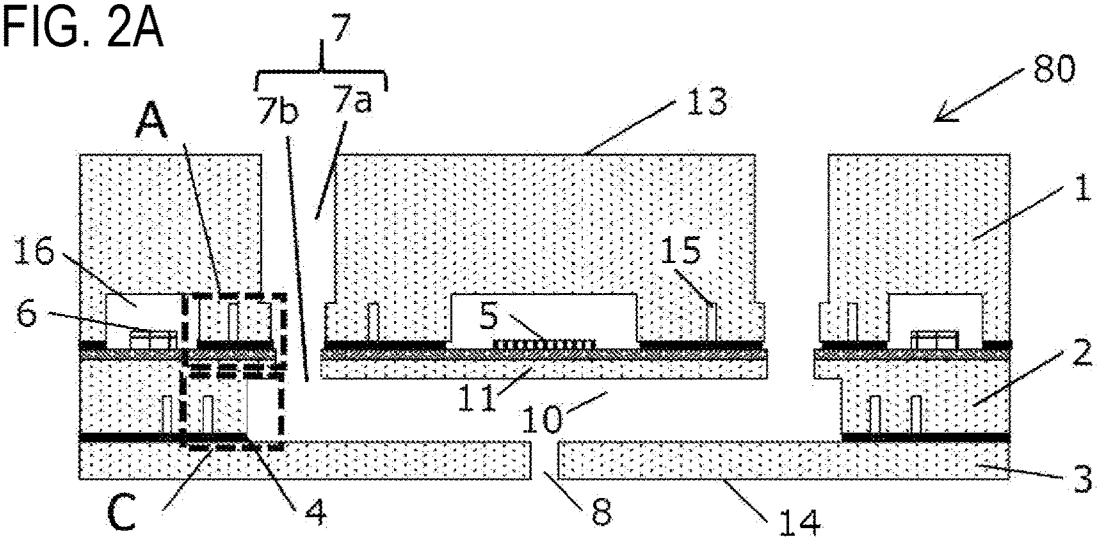
FIGS. 2A to 2C are schematic cross-sectional views showing the step of producing the joined substrate.

In the second substrate 2, the pressure chambers 10 and the grooves 15 are formed by sputtering. The protective film 18 may be provided between the substrates. As shown in FIG. 2A, the second substrate 2 has the structure of forming the piezoelectric elements and the electrodes on the substrate made from silicon.

Step of Applying Adhesive

The adhesive 4 is formed in a direct write manner by dispensing, or by patterning by photo lithography or the like. Because the wettability of the joining interface for the adhesive is also important, the substrates before joined may be surface-treated with oxygen plasma or the like. Examples of other methods of applying the adhesive 4 include a transfer method, screen printing, and dispensing application which use glass or PET as a base material. The thickness of the organic film is not particularly limited, but is preferably 0.1 μm to 10 μm, and more preferably 1 μm to 5 μm.

As the adhesive 4, any material with high adhesiveness to the substrates is preferably used. Any material with inclusion of less bubbles etc., and powerful application properties are preferable, and any material having such a low viscosity that the thickness of the adhesive is easily reduced are also preferable. The adhesive preferably contains any resin selected from the group consisting of epoxy resins, acrylic resins, silicone resins, benzocyclobutene resins, polyamide resins, polyimide resins, and urethane resins. Examples of the system of curing of the adhesive 4 include a heat curing system, and an ultraviolet delayed curing system. When any of the substrates is ultraviolet transparent, an ultraviolet curing system may be also used.

Here, one example of the transfer method will be shown. First, a base material for transferring the adhesive is prepared, and is spin-coated with a benzocyclobutene solution as the adhesive 4, so that the adhesive 4 is 3 μm. A PET film is used as the base material for the transfer. After the coating, baking is performed for five minutes at 100° C. for volatilizing a solvent. The adhesive 4 formed on the base material for the transfer is brought into contact with the joining face of the first substrate 1 while heating, and thereby, the adhesive 4 is transferred to the first substrate 1.

Joining Step

The first substrate 1 where the adhesive 4 is formed, and the second substrate 2 are heated to a predetermined temperature inside a joining device, and thereafter, pressurized for a predetermined period of time at a predetermined pressure to whereby join together. These joining parameters are properly set according to the material of the adhesive. Joining in a vacuum is preferable because inclusion of bubbles in the joining parts is suppressed. During the joining, the adhesive 4 is softened by heating, and further, pressurized, and thus, the adhesive 4 flows into the openings from the joining faces as shown in FIG. 3B.

A large amount of the degassed from the adhesive 4 in the step of forming a protective film which follows the joining step may lead to cracking or peeling of the protective film 9. Therefore, when the adhesive 4 is of a thermosetting type, the adhesive 4 may be heated inside the joining device until being cured. The curing may be accelerated by, after the joining, taking out, and separately heating the joined substrate body in an oven or the like. When the adhesive 4 is of an ultraviolet delayed type, preferably, the joining is performed after the adhesive 4 is irradiated with a prescribed quantity of ultraviolet rays in advance prior to the joining. After the joining, preferably, the joined substrate body is further heated to sufficiently accelerate the curing. When the adhesive 4 is of an ultraviolet curing type, the adhesive 4 is irradiated with a prescribed quantity of ultraviolet rays across the ultraviolet transparent substrate to be cured after the substrates are joined. After the joining, preferably, the joined substrate body is further heated to sufficiently accelerate the curing.

Here, an example of joining by heat curing when the foregoing benzocyclobutene solution is used as the adhesive 4 will be described. At this time, the first substrate 1 and the second substrate 2 are joined by heating in a vacuum while positioned using a joining alignment device. The degree of vacuum is set to be at most 100 Pa, and the temperature is set to be 150° C. The joined substrate 80 after the joining is completed is taken out of the device after cooling, and is subjected to heat treatment in an oven of a nitrogen atmosphere at 250° C. for one hour to cure the adhesive 4. At this time, the spreading width D of the adhesive 4 is 10 μm. The second substrate 2 is thinned with a grinding device until the thickness thereof reaches 100 μm. Similarly, the third substrate 3 made from silicon, and having a thickness of 625 μm is joined, and thereafter, thinned with a grinding device until the thickness thereof reaches 100 μm. The ejection ports 8 are formed through a second face of the third substrate 3 (opposite face of a face which faces the second substrate 2) to form the joined substrate 80. The joined substrate 80 as shown in FIG. 2A is formed by such joining.

Step of Forming Protective Film

Figure 2B:
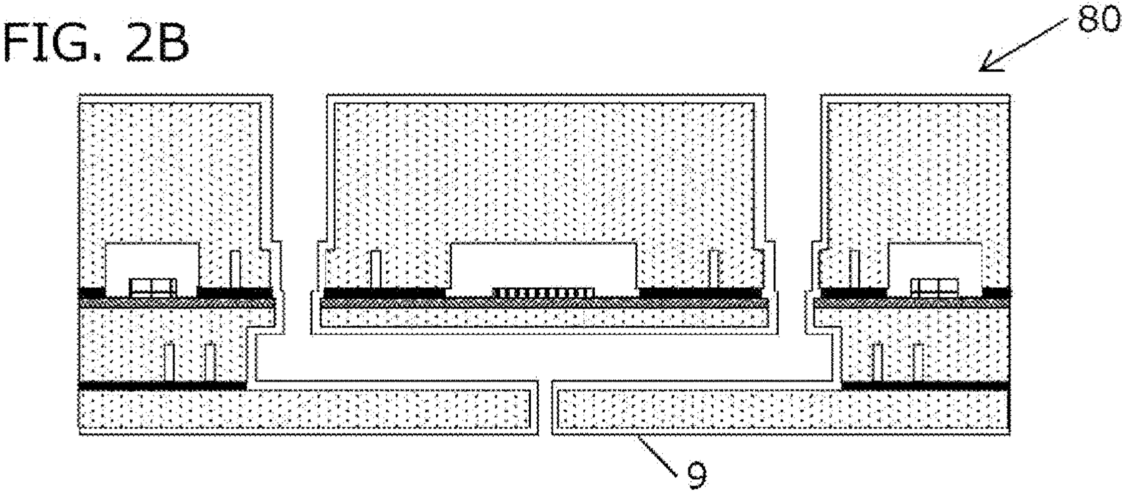

Next, as shown in FIG. 2B, the protective film 9 is formed uniformly from a first face of the joined substrate 80 along the inner walls of the ink channels and the top of the adhesive to the second face. The protective film 9 is formed by repeating surface saturation adsorption of at least one agent selected from the group consisting of oxidizing agents and nitriding agents, and a raw material gas by atomic layer deposition (ALD method).

The protective film 9 contains an inorganic element, and preferably contains a simple substance, an oxide, a nitride, or a carbide of at least one element selected from the group consisting of Ta, Ti, Zr, Nb, V, Hf and Si. Among them, an oxide of at least one element selected from the group consisting of Ta, Ti, Zr, Nb, V, Hf and Si is preferably contained, and at least one compound selected from the group consisting of TaO, TiO, SiOC, SiC, SiCN, TaN, TiN and HfO is more preferably contained.

Direct formation of the protective film 9 on the organic film (adhesive 4) may cause the protective film 9 to peel by any force acting on the interface between the protective film 9 and the organic film (adhesive 4) when the adhesive force between the protective film 9 and the organic film (adhesive 4) is weak, when the rigidity of the protective film 9 is insufficient even when the adhesive force is maintained, or when both the adhesive force and the rigidity are insufficient. When the protective film 9 peels, it is considered that ink entering from the portion where the protective film 9 peeled damages the organic film (adhesive), which brings about bad joining of the substrates. It is also considered that the protective film 9 peeled to constitute foreign substances floating in the channels, which may influence ejection performance.

In view of the foregoing, desirably, the protective film 9 have a thickness to some extent or more. In contrast, too much a film thickness may cause, for example, peeling by the film stress of the protective film. Thus, the thickness is at least 50 nm and not more than 250 nm, and more preferably at least 80 nm and not more than 180 nm. The method of forming the protective film 9 may be any other method such as sputtering and CVD.

Here, an example of subjecting the joined substrate 80 produced by the foregoing heat curing method to ALD film formation will be described. At this time, a thermal ALD-TaO film is formed with an ALD film forming apparatus. At this time, the film formation cycle is as follows. A gas formed by vaporizing a substrate having Ta in a molecule thereof, and nitrogen are together conveyed into a furnace to be sprayed for 2.5 seconds, and thereafter, purging with nitrogen, and discharge are sufficiently performed. Next, a gas formed by vaporizing an oxidizing agent, and nitrogen are together conveyed into the furnace to be sprayed for 5 seconds, and thereafter, purging with nitrogen, and discharge are sufficiently performed. The above cycle, as one cycle, is repeated approximately 2000 times to layer a tantalum oxide film by 130 nm at a film formation temperature controlled to 230° C.±10° C., so that the joined substrate 80 coated with the protective film 9 is obtained. According to this, the joined substrate 80 as shown in FIG. 2B is formed.

Step of Forming Liquid-Repellent Film

Figure 2C:
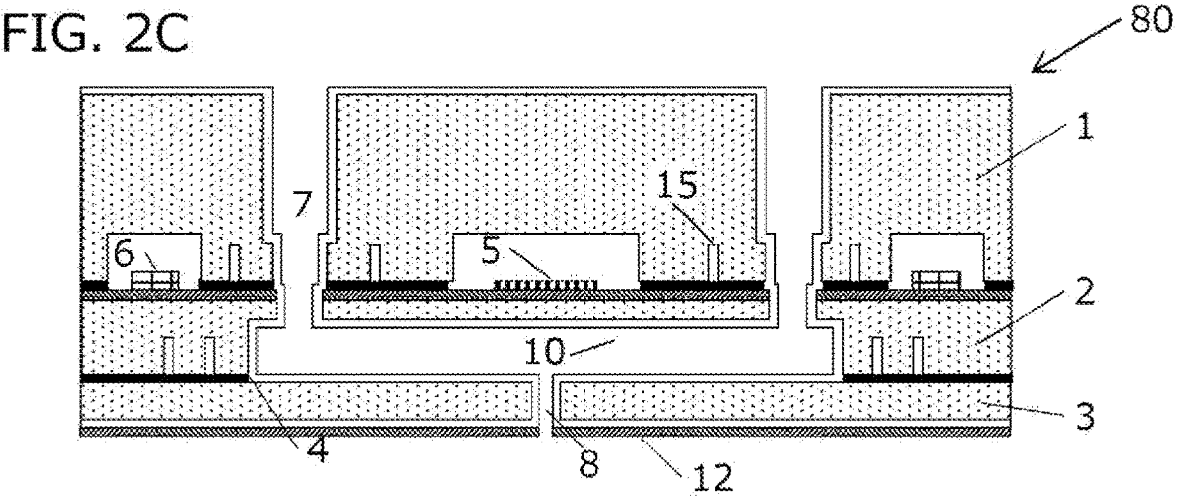

Next, as shown in FIG. 2C, a liquid-repellent film 12 is formed on the protective film 9, which is formed on the second face (face on the ejection ports 8 side) of the joined substrate 80. The liquid-repellent film 12 is not particularly limited as long as being repellent to ink, and for example, a material containing a fluorine-based polymer may be used therefor. When a fluorine-based polymer is used as the liquid-repellent film 12, providing an intermediate film as appropriate can improve the adhesiveness of the protective film 9 and the liquid-repellent film 12. For example, the intermediate film is a silicon oxide film. Before the liquid-repellent film 12 is formed, surface treatment such as ashing may be performed.

It was found out that using the joined substrate produced as the foregoing for the liquid ejection head can suppress gathering of bubbles, and impeding of the ink flow by providing corner parts in ink channels with R's, and by equating the wettability on the inside of the ink channels. This can improve the efficiency in circulation of ink to improve the appearance of print.

Embodiment 2

Figure 15A:
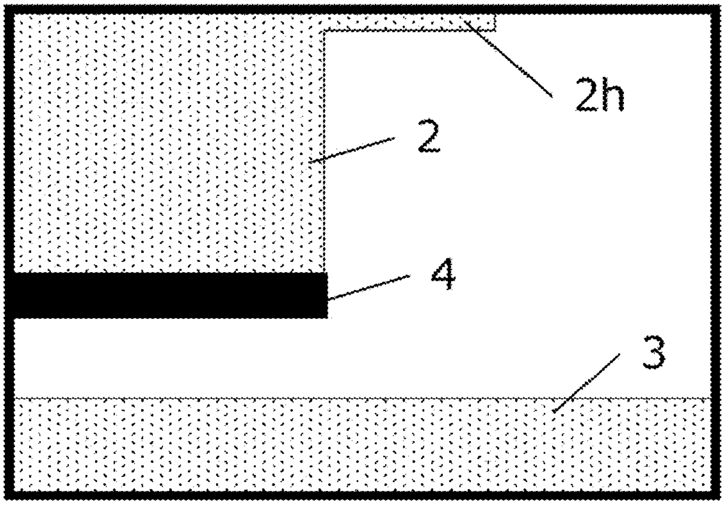
FIGS. 15A to 15C are schematic cross-sectional views of the joined substrate according to embodiment 2.
Figure 15B:
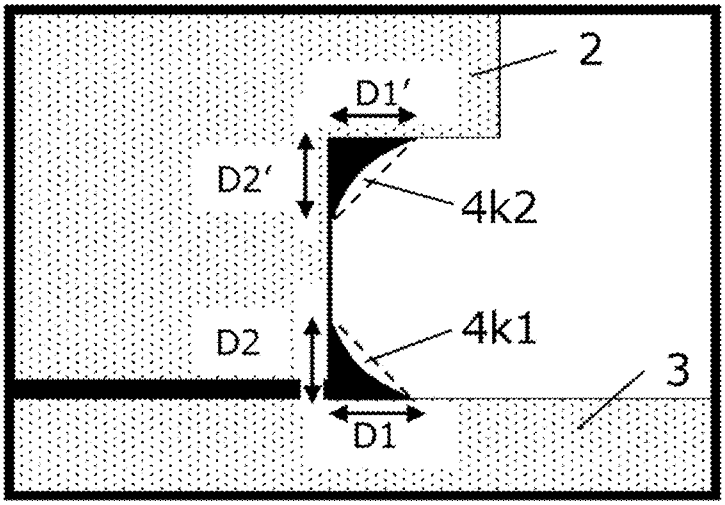
Figure 15C:
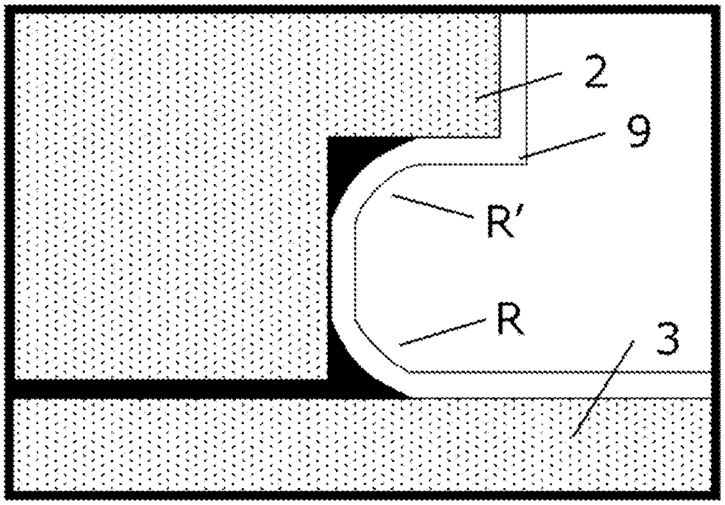

FIGS. 15A to 15C are enlarged cross-sectional views of the area indicated by the dashed line C shown in FIG. 2A. Here, joining of the second substrate 2 and the third substrate 3 will be described. The basic structure is the same as joining of the first substrate 1 and the second substrate 2. FIG. 15A is a cross-sectional view of the area C before the substrates are joined. The second substrate 2 has an overhang 2*h* upward when viewed from the area where the adhesive 4 spreads.

FIG. 15B is a cross-sectional view when the substrates are joined. Joining the second substrate 2 having the overhang 2*h* leads to provision of a portion 2*r* that is continuously depressed in a depth direction of the drawings. Under proper conditions of the film thickness of the adhesive 4 in applying, and proper conditions of the adhesive storing part, the spreading amount of the adhesive 4 can be to such a degree that the spread progresses from the adhering interface along the wall to the corner part on the top face. As a result, a second concave part 4*k*2 can be also formed on the corner part of the overhang 2*h* in addition to a concave part 4*kl* that is continuous to the joining faces. The distance of the second concave part 4*k*2 in the layering direction is defined as D2', and the distance thereof in the extending direction is defined as D1'. According to the foregoing, as shown in FIG. 15C, more preferred R-shapes for suppressing bubble gathering in circulation of ink can be obtained when the protective film 9 is formed.

As the foregoing, using the present invention can lead to obtainment of a liquid ejection head such that bubble gathering, and impeding of the ink flow in the ink channels are suppressed by providing an adhesive which covers corner parts between joined substrates in an arcuate concave form, and providing a protective film which is continuous along the surfaces of the substrates, the channels, and the adhesive in the substrates formed by joining with the adhesive.

Embodiment 3

Application Example

Figure 16A:
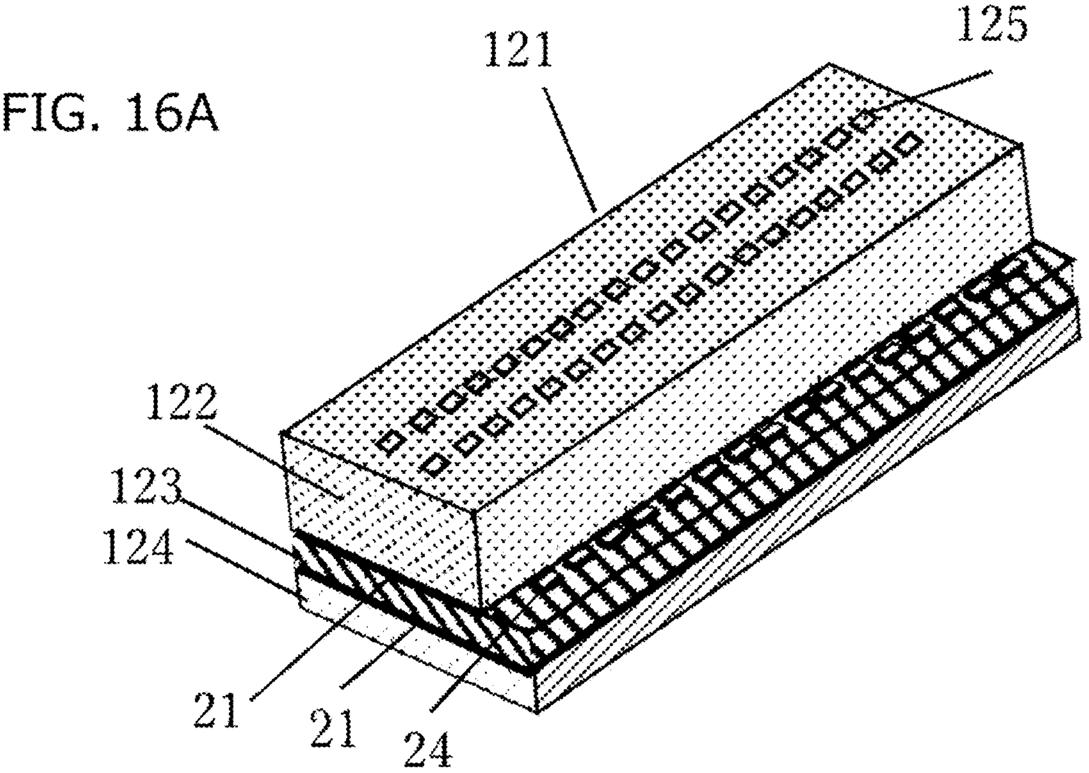
FIGS. 16A and 16B are schematic views showing one example of a printing element.
Figure 16B:
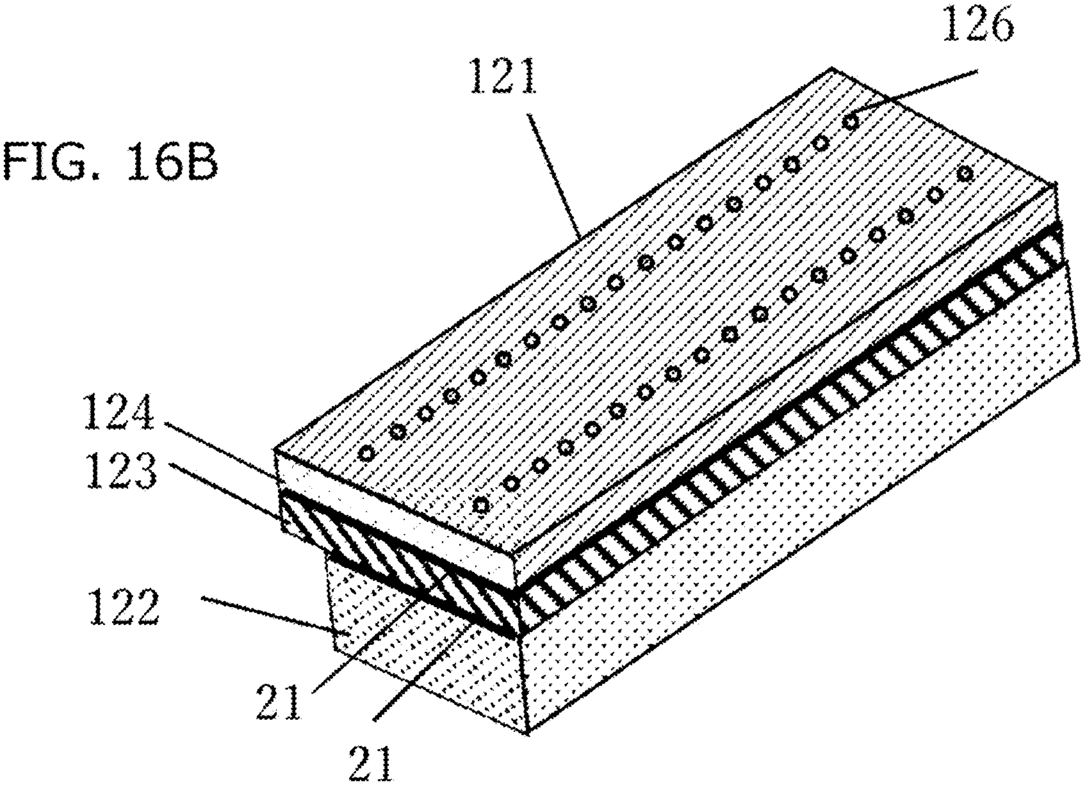
Figure 17:
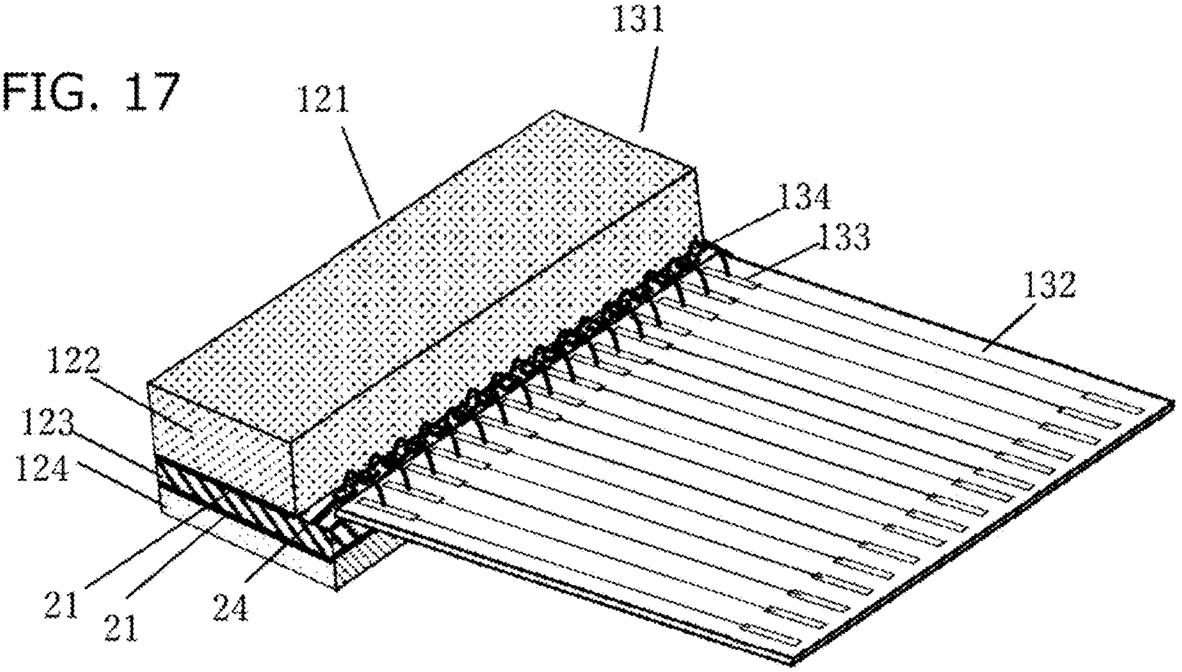
FIG. 17 is a schematic view showing one example of a printing element unit.
Figure 18:
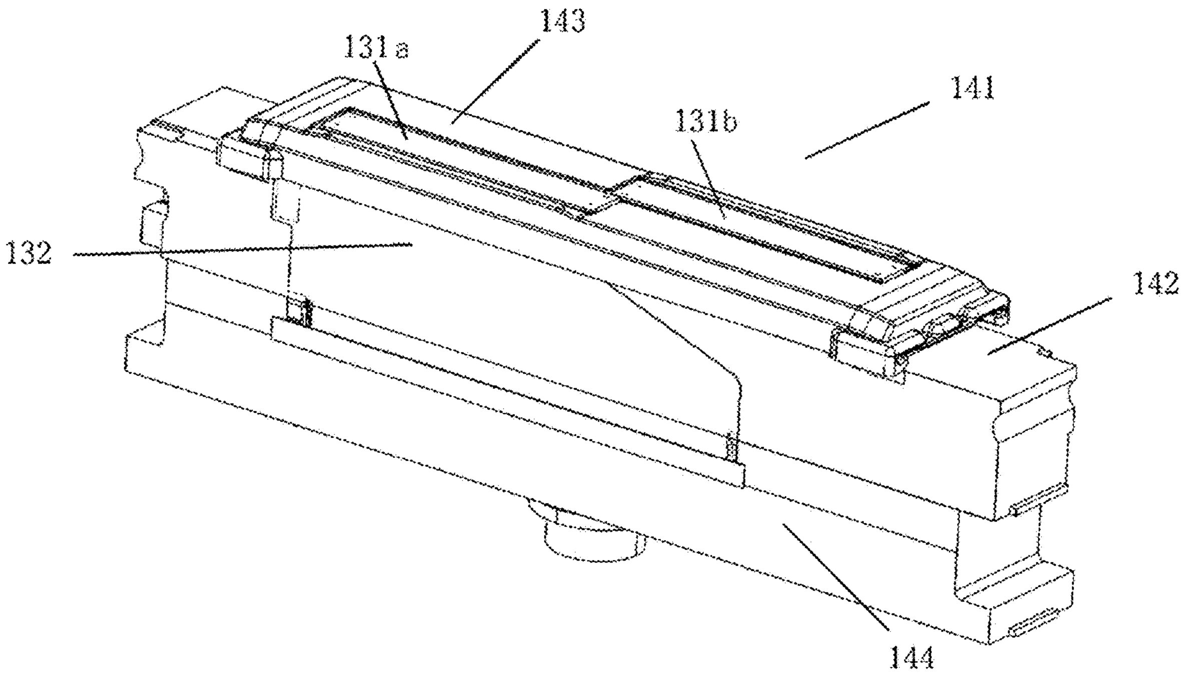
FIG. 18 is a schematic view showing one example in a mode of a liquid ejection head.

The method of producing the joined substrate 80 according to any of the embodiments can be used as the method of producing the liquid ejection head. FIGS. 16A and 16B are schematic views showing one example of a printing element that can be used for a liquid ejection printing apparatus or the like. FIG. 16A is a schematic view where the ink feeding port side is a top face, and FIG. 16B is a schematic view where the ejection port side for liquid such as ink is a top face. FIG. 17 is a schematic view showing an example of a printing element unit to which the printing element of FIGS. 16A and 16B, and an electric wiring substrate are electrically connected. FIG. 18 is a schematic view showing one example when the printing element unit of FIG. 17 is used as a liquid ejection head of an inkjet system.

A printing element 121 in FIGS. 16A and 16B has a three-layered structure of an ink channel substrate 122, an ink ejection energy generating substrate 123, and an ink ejection substrate 124 which are joined by adhesive layers 21. The first substrate 1 according to the embodiments corresponds to the ink channel substrate 122. The portion corresponding to the second substrate 2 is the ink ejection energy generating substrate 123. The portion corresponding to the third substrate 3 is the ink ejection substrate 124.

The ink ejection substrate 124 is provided with a plurality of ink ejection ports 126 for ejecting ink. For them, the ejection ports 8 shown in embodiment 1 can be used. Ink channels 125 for introducing ink to a plurality of the ink ejection ports 126 are formed in the ink channel substrate 122. For them, the ink channels 7 shown in embodiment 1 can be used. The ink ejection energy generating substrate 123 is provided with energy generating elements (not shown) which generate energy to eject ink from the ink ejection ports 126. For supplying electricity to the energy generating elements, terminals 24 which serve as electric connection parts for electrical connection to the outside are also provided. Such a printing element 121 of the three-layered structure which has a space part 23 is obtained by the method of producing the joined substrate according to any of the embodiments.

The printing element unit 131 of FIG. 17 is formed by connecting the printing element 121 of FIGS. 16A and 16B, and an electric wiring substrate 132. Using wire bonding, the terminals 24 of the printing element 121, and lead parts 133 of the electric wiring substrate 132 are electrically connected to each other, respectively, by electric connection members 134. The electric connection members 134 may be any members as long as the principal component thereof is, for example, any one metal of gold, copper, aluminum and silver, or an alloy containing at least two of these metals. The electrically connecting method is not limited to wire bonding, but may be bump bonding, lead terminals, NCP, or ACF.

A liquid ejection head 141 of FIG. 18 is constituted of a supporting member 142 which joins the printing element unit 131 of FIG. 17, a face cover 143 which protects the printing element unit 131, and a channel member 144 to feed ink. In the printing element unit 131, two units (131*a* and 131*b*) are aligned, and the ink ejection ports 126 are on the top side of the drawing. Ink can be ejected by feeding the ink to the inkjet printing element unit 131 via the channel member 144 and the supporting member 142, and giving the electric wiring substrate 132 electrical signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-134329, filed on Aug. 22, 2023, which is hereby incorporated by reference wherein in its entirety.

What is claimed is:

1. A liquid ejection head comprising:

a joined substrate of a first substrate and a second substrate, the first substrate and the second substrate being layered and joined with an adhesive, wherein the joined substrate is configured to have a liquid channel with which the first substrate and the second substrate communicate, on a joining position of the first substrate and the second substrate, the adhesive is disposed at a corner part so as to form an arcuate shape convex toward the corner part on a cross section thereof, the corner part being formed at a position corresponding to the liquid channel, the corner part being formed by an end face of the first substrate, and a plane of the second substrate, on the joining position, a protective film is provided so as to be continuous from the first substrate via the adhesive disposed on the corner part to the second substrate, the adhesive disposed on the corner part is a spread of the adhesive applied to joining faces when the first substrate and the second substrate are joined, and when a direction where the first substrate and the second substrate are layered is defined as a layering direction, and a direction which crosses the layering direction, and where the first substrate and the plane of the second substrate extend is defined as an extending direction, on the cross section at the corner part, the spread of the adhesive is on a side closer to the corner part than a line connecting a position furthest from the corner part in the spread in the layering direction, and a position furthest from the corner part in the spread in the extending direction.

2. The liquid ejection head according to claim 1, wherein at least one of the first substrate and the second substrate is provided with a groove configured to store the adhesive.

3. The liquid ejection head according to claim 2, wherein the groove is provided for controlling an amount of the spread of the adhesive at the corner part.

4. The liquid ejection head according to claim 1, wherein on the cross section at the corner part, the spread of the adhesive in the layering direction, and the spread of the adhesive in the extending direction each have a width of 5 μm to 15 μm.

5. The liquid ejection head according to claim 1, wherein the protective film has a film thickness of 80 nm to 180 nm.

* * * * *